US009483793B1

(12) United States Patent
Varadhan et al.

(10) Patent No.: US 9,483,793 B1
(45) Date of Patent: *Nov. 1, 2016

(54) IMMERSIVE MULTIMEDIA VIEWS FOR ITEMS

(71) Applicant: Amazon Technologies, Inc., Reno, NV (US)

(72) Inventors: Devraj Varadhan, Bellevue, WA (US); Sean M. Scott, Sammamish, WA (US); Douglas J. Gradt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 580 days.

This patent is subject to a terminal disclaimer.

(21) Appl. No.: 13/975,645

(22) Filed: Aug. 26, 2013

Related U.S. Application Data

(63) Continuation of application No. 13/033,288, filed on Feb. 23, 2011, now Pat. No. 8,527,359.

(51) Int. Cl.
*G06Q 30/06* (2012.01)

(52) U.S. Cl.
CPC ...... *G06Q 30/0643* (2013.01); *G06Q 30/0601* (2013.01)

(58) Field of Classification Search
CPC .................. G06Q 30/0601; G06Q 30/0643
See application file for complete search history.

(56) References Cited

U.S. PATENT DOCUMENTS

| 7,013,428 B1 | 3/2006 | Kamen et al. |
| 7,466,875 B1 | 12/2008 | Siegel et al. |
| 7,468,735 B2 | 12/2008 | Larsen et al. |
| 8,015,507 B2 | 9/2011 | Madsen et al. |
| 8,140,404 B1 | 3/2012 | Scott et al. |
| 8,347,211 B1 | 1/2013 | Rogers et al. |
| 2003/0149983 A1 | 8/2003 | Markel |
| 2006/0080306 A1 | 4/2006 | Land et al. |
| 2009/0164944 A1 | 6/2009 | Webster et al. |
| 2010/0094714 A1* | 4/2010 | Varon ................ G06Q 30/0276 705/14.72 |
| 2011/0016376 A1 | 1/2011 | Hinson |

OTHER PUBLICATIONS

Endless.com. Example of Product View in Full Screen Mode, Copyright 2006-2010, retrieved May 17, 2010, 2 pages.
U.S. Appl. No. 12/820,817, filed Jun. 22, 2010, U.S. Pat. No. 8,347,211 issued Jan. 1, 2013 for "Immersive Multimedia View's for Items".
U.S. Appl. No. 13/007,316, filed Jan. 14, 2011, U.S. Pat. No. 8,140,404 issued Mar. 20, 2012 for "Browsing with Static Pages".

* cited by examiner

*Primary Examiner* — Yogesh C Garg
(74) *Attorney, Agent, or Firm* — Thomas | Horstemeyer, LLP

(57) ABSTRACT

Disclosed are various embodiments that provide immersive multimedia views for items. An immersive view for an item is rendered upon a display. The immersive view features an image of the item surrounded by a user interface layer that provides information about the item. The user interface layer is hidden when a cursor moves onto a first portion of the immersive view corresponding to the image of the item. The image of the item is replaced with a video stream of the item when the cursor moves onto a second portion of the immersive view corresponding to the image of the item.

20 Claims, 12 Drawing Sheets

IMMERSIVE MULTIMEDIA VIEWS FOR ITEMS

CROSS REFERENCE TO RELATED APPLICATIONS

This application is a continuation of, and claims priority to, co-pending U.S. Patent Application entitled "IMMERSIVE MULTIMEDIA VIEWS FOR ITEMS," filed on Feb. 23, 2011, and assigned application Ser. No. 13/033,288, which is incorporated herein by reference in its entirety.

BACKGROUND

Customers who are seeking to purchase products from online merchants may want to see what a product looks like and to read information about the product. However, customers may be disappointed with an image of the product if the image is a small image, the image is of low quality, or if the image does not show a particular angle of the product. Such disappointment may translate into a lost sale for the online merchant if the customer instead decides to purchase the product in person from a brick-and-mortar retail store.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing immersive multimedia views for items. As used herein, the term "item" refers to any good, product, service, software item, multimedia item, or other item that may be offered for sale, purchase, rental, lease, download, and any other form of consumption as can be appreciated. Embodiments of the present disclosure provide an enhanced experience for users of a network site by allowing the users to view high resolution media objects, for example, in a full browser window or a full screen format. A fade away user interface may be provided to focus attention on the media object. In various embodiments, an image of an item may transition into a video of the item. In the following discussion, a general description of the system and its components is provided, followed by a discussion of the operation of the same.

Figure 1:
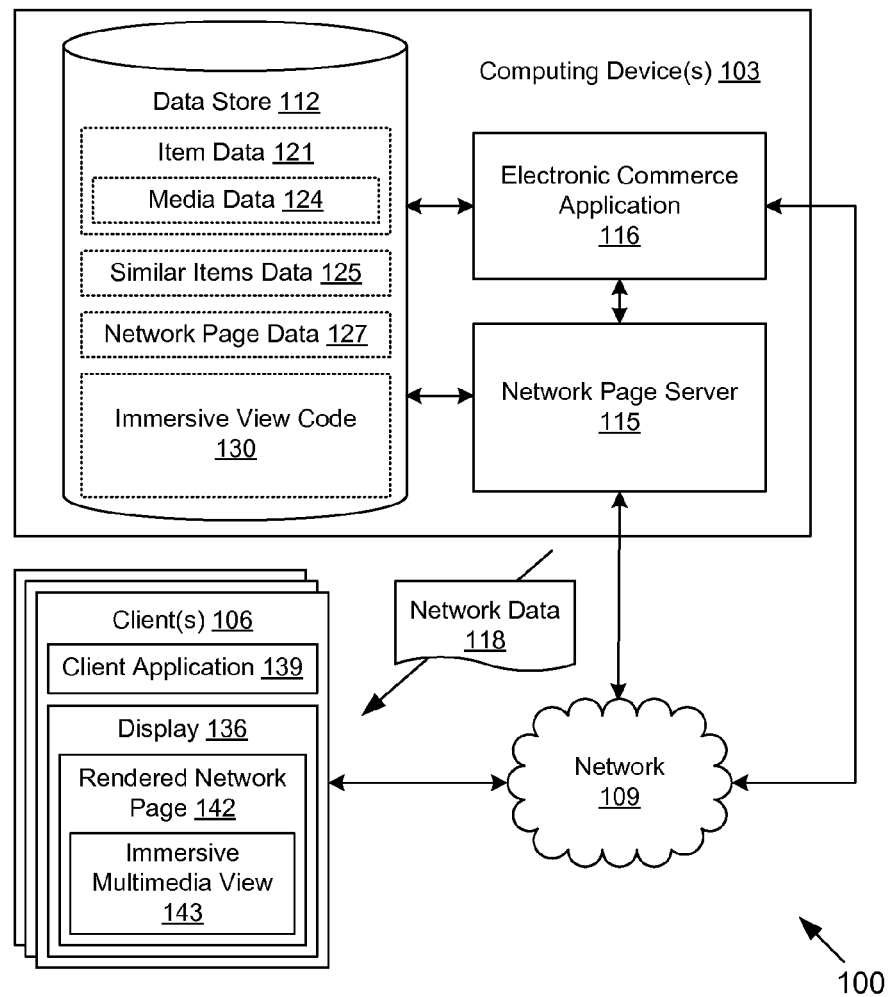
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network page server 115, an electronic commerce application 116, and other applications, services, processes, systems, engines, or functionality not discussed in detail herein. The network page server 115 is executed to generate and serve up network data 118 associated with items, where the network data 118 includes code for rendering an immersive multimedia view in the client 106. The network data 118 may include network pages such as web pages or other forms of network content. Non-limiting examples of commercially available network page servers 115 include Apache® Hypertext Transfer Protocol (HTTP) Server, Apache® Tomcat®, Microsoft® Internet Information Services (IIS), etc. It is understood that the network page server 115 may operate in conjunction with various applications, scripts, servers, etc. in order to generate the network data 118.

The electronic commerce application 116 is executed in order to facilitate the online purchase of items over the network 109. The electronic commerce application 116 also performs various backend functions associated with the online presence of a merchant in order to facilitate the online purchase of items. For example, the electronic commerce application 116 may generate network pages or portions thereof that are provided to clients 106 through the network data 118 served up by the network page server 115 for the purposes of selecting items for purchase, rental, download, lease, or other forms of consumption.

The data stored in the data store 112 includes, for example, item data 121, media data 124, similar items data 125, network page data 127, immersive view code 130, and potentially other data. The item data 121 may include any data relating to items presented on a network site, including, but not limited to, title, description, quantity, price, customer reviews, shipping specifications, options, and/or other data. In particular, the item data 121 includes media data 124 which comprises a plurality of media objects related to the item. The media data 124 may include any multimedia associated with an item such as, for example, high resolution images, thumbnail images, audio content, video content, annotated images, spinnable images, three-dimensional representations, interactive animations, and/or any other multimedia content forms that may be associated with an item.

The similar items data 125 may describe relationships between items that are deemed similar. As an example, items may be similar if one is an accessory for another. As another example, items may be similar if they have similar descriptions. As yet another example, items may be similar if they are frequently ordered together, or if customers tend to order one after viewing a description of another. It is understood that items may be deemed similar based in part on many different types of data such as, for example, browse history data, order history data, and so on.

The network page data 127 includes any data that may be used in generating network data 118 to be sent to a client 106. To this end, network page data 127 may include templates, graphics, text, markup code such as hypertext markup language (HTML), extensible markup language (XML), and other markup code, executable code, interpreted code, and/or any other data that may be used in generating network data 118. The immersive view code 130 includes code that may be configured to render an immersive multimedia experience in a client 106. The immersive view code 130 may be configured to render one or more network pages or screens in the client. To this end, the immersive view code 130 may comprise dynamic HTML (DHTML), JavaScript®, Ajax, Flash®, computer-assisted drafting (CAD) drawing plug-ins, and/or any other code that may be used to facilitate an interactive immersive multimedia experience in a web browser or other application. The immersive view code 130 may be configured to request additional network data 118 from the network page server 115 in order to render the immersive multimedia experience.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 136. The display 136 may comprise, for example, one or more devices such as cathode ray tubes (CRTs), liquid crystal display (LCD) screens, gas plasma-based flat panel displays, LCD Projectors, or other types of display devices, etc.

The client 106 may be configured to execute various applications such as a client application 139 and/or other applications. The client application 139 may be executed in a client 106, for example, to access and render network data 118, such as web pages, or other network content served up by the computing device 103 and/or other servers. In one embodiment, the client application 139 corresponds to a browser. A rendered network page 142 may be displayed on the display 136, and an immersive multimedia view 143 may be rendered on top of or in conjunction with the rendered network page 142. The client 106 may be configured to execute applications beyond the client application 139 such as, for example, browser applications, email applications, instant message applications, and/or other applications.

Next, a general description of the operation of the various components of the networked environment 100 is provided. To begin, a user at a client 106 requests a network page from the network page server 115 that includes the immersive view code 130 for rendering an immersive multimedia view 143 for an item. The network page server 115 then generates the network page and immersive view code 130 for the item from the item data 121, media data 124, network page data 127 and/or other data. The client 106 obtains the network data 118 including the network page and associated immersive view code 130 from the network page server 115 over the network 109.

The client application 139 executed in the client 106 renders the immersive multimedia view 143 on the display 136 in conjunction with a rendered network page 142. The immersive multimedia view 143 may fill an entire window associated with the client application 139 and/or the entire display 136 in a full-screen mode. The immersive multimedia view 143 may, for example, feature an item offered for order through the electronic commerce application 116. In various embodiments, the immersive multimedia view 143 features a relatively prominent image of the item surrounded by peripheral content and control components, which are referred to herein as a user interface layer. Although the term "user interface layer" is used herein for convenience, this term is not intended to be limiting. In various embodiments, such peripheral content and control components may be in multiple layers or may not be in a layer at all.

The peripheral content of the user interface layer provides various descriptive information about the item. As non-limiting examples, the user interface layer may present the title of the item, a description of the item, prices for the item, available colors and/or other options for the item, and so on. The user interface layer may include control components that facilitate ordering the item and/or adding the item to a list such as, for example, a shopping cart, wish list, gift registry, etc. The user interface layer may also include control components that allow navigation to similar items as determined from the similar items data 125, items listed in search results, and/or other items. The user interface layer may have a transparent background or the same background as the image of the item. Further, the user interface layer may overlap portions of the image of the item.

In some embodiments, the immersive multimedia view 143 is configured to allow the user to zoom in on the image of the item by moving the cursor over the image of the item or a region associated with the image of the item. When the cursor moves over the image of the item, the user interface layer may be hidden. In one embodiment, a higher resolution image of the item may be presented to fill the viewport of the immersive multimedia view 143. In one embodiment, the transparency of the user interface layer may depend on the movement of the cursor along an axis. For example, when the cursor is moved nearer to the center of the image, the user interface layer may become more transparent until it becomes invisible. Conversely, when the cursor is moved away from the center of the image (e.g., toward a component of the user interface layer), the user interface layer may again become visible and more opaque.

In some embodiments, the immersive multimedia view 143 is configured to replace the image of the item with a video of the item when the user moves the cursor over the image of the item or a specific region associated with the image of the item. The image of the item may correspond to a key frame of the video, such as an initial frame or an ending frame. Likewise, when the video completes, or is paused, at a frame, that frame may continue to be rendered in the immersive multimedia view 143.

As a non-limiting example, the item may correspond to an article of clothing, and the image of the item may depict a model wearing the article of clothing. When the user activates the video of the item, the model may suddenly start moving, e.g., by turning around, walking toward the user along the z-axis, walking away from the user along the z-axis, etc. The transition from image to video may be smooth, thereby allowing the user to focus on important details of the particular article of clothing, such as fit, fabric, movement, and so on.

The user interface layer of the immersive multimedia view 143 may have various controls to facilitate the selection of colors, fabrics, and/or other options. For example, when a different fabric is selected, the immersive view code 130 may be configured to obtain additional network data 118 from the network page server 115 in order to show images and/or view pertaining to the different fabric. Alternatively, the immersive view code 130 may be configured to modify the current images and/or video to replace a color, fabric, etc. according to the selected option.

The immersive multimedia view 143 may be configured for navigation to other items. To this end, icons, images, etc. that represent other items may be rendered in the user interface layer of the immersive multimedia view 143. When a user selects a graphical representation of another item (or a navigational control such as an arrow or other user interface component), the image or video of the current item may slide out of view, and an image or view of another item may slide into view. Accordingly, the user interface layer may be updated with the information pertaining to the newly displayed item. Various techniques that may be applied to update the immersive multimedia view 143 for browsing different items are described in U.S. Patent Application entitled "Browsing with Static Pages" filed on Jan. 14, 2011 and assigned application Ser. No. 13/007,316, which is incorporated herein by reference in its entirety.

Figure 2:
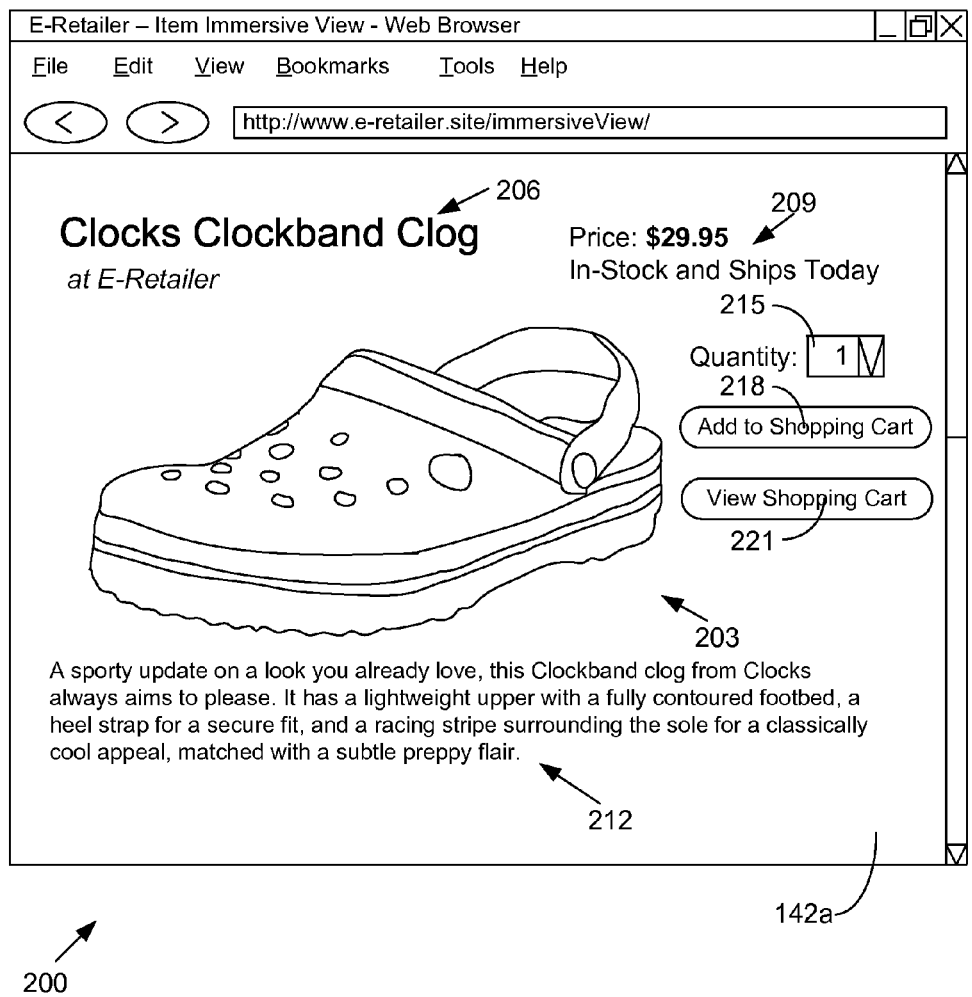
FIGS. 2-7 are drawings of examples of user interfaces rendered by a client in the networked environment of FIG. 1 according to various embodiments of the present disclosure.

Referring next to FIG. 2, shown is one example of a user interface 200 rendered by a client application 139 (FIG. 1) executed in a client 106 (FIG. 1) in the networked environment 100 (FIG. 1). This example shows a rendered network page 142a embodying an immersive multimedia view 143 (FIG. 1) for an item that is a shoe. In particular, FIG. 2 shows the immersive multimedia view 143 as it is initially rendered for the item. The rendered network page 142a features a prominent item image 203 surrounded by user interface elements. The user interface elements include an item title 206, an item price 209, an item description 212, a quantity selector 215, an add to shopping cart component 218, a view shopping cart component 221, and/or other elements.

When a user selects the add to shopping cart component 218, the electronic commerce application 116 (FIG. 1) may be configured to add the item to a shopping cart of the user. The immersive multimedia view 143 may subsequently be updated or another network page may be returned for rendering. In other examples, other functions such as initiating an order, checkout, single-click ordering, etc. may be facilitated through user interface elements on the rendered network page 142a.

Figure 3A:
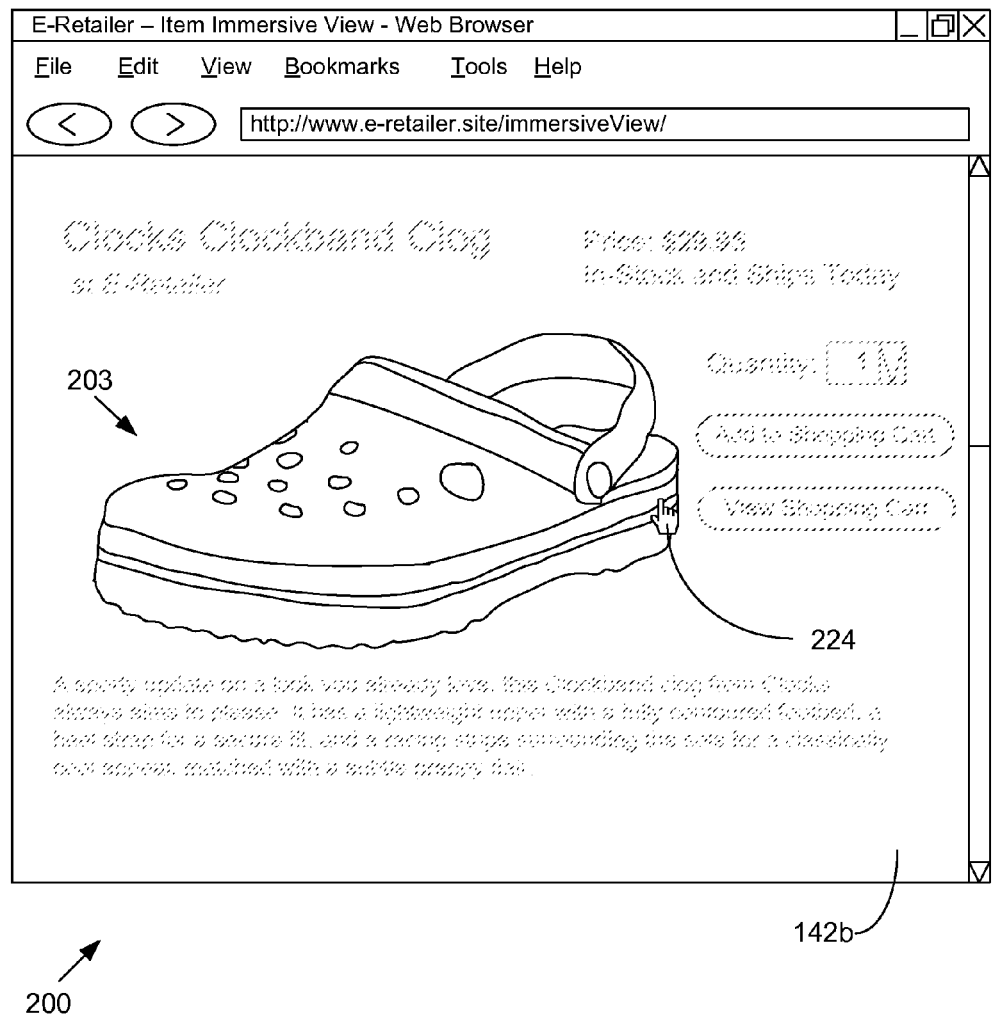

Turning now to FIG. 3A, shown is another example of a user interface 200 rendered by a client application 139 (FIG. 1) executed in a client 106 (FIG. 1) in the networked environment 100 (FIG. 1). This example shows a rendered network page 142b embodying an immersive multimedia view 143 (FIG. 1) for an item that is a shoe. In particular, FIG. 3A shows the immersive multimedia view 143 with peripheral content and control components of the user interface layer being partially hidden or partially transparent. A cursor 224 is shown positioned on top of the item image 203. In various embodiments, when a user moves the cursor 224 onto the image or a region associated with a portion of the image, the user interface becomes hidden. In one embodiment, the user interface layer, which initially overlaps and surrounds the image, becomes increasingly transparent as the cursor 224 is moved toward along an axis until the user interface layer becomes invisible. Other transitions to remove or bring in the user interface layer (e.g., wipes, directional fades, flying in or out, etc.) may be employed in other embodiments.

Figure 3B:
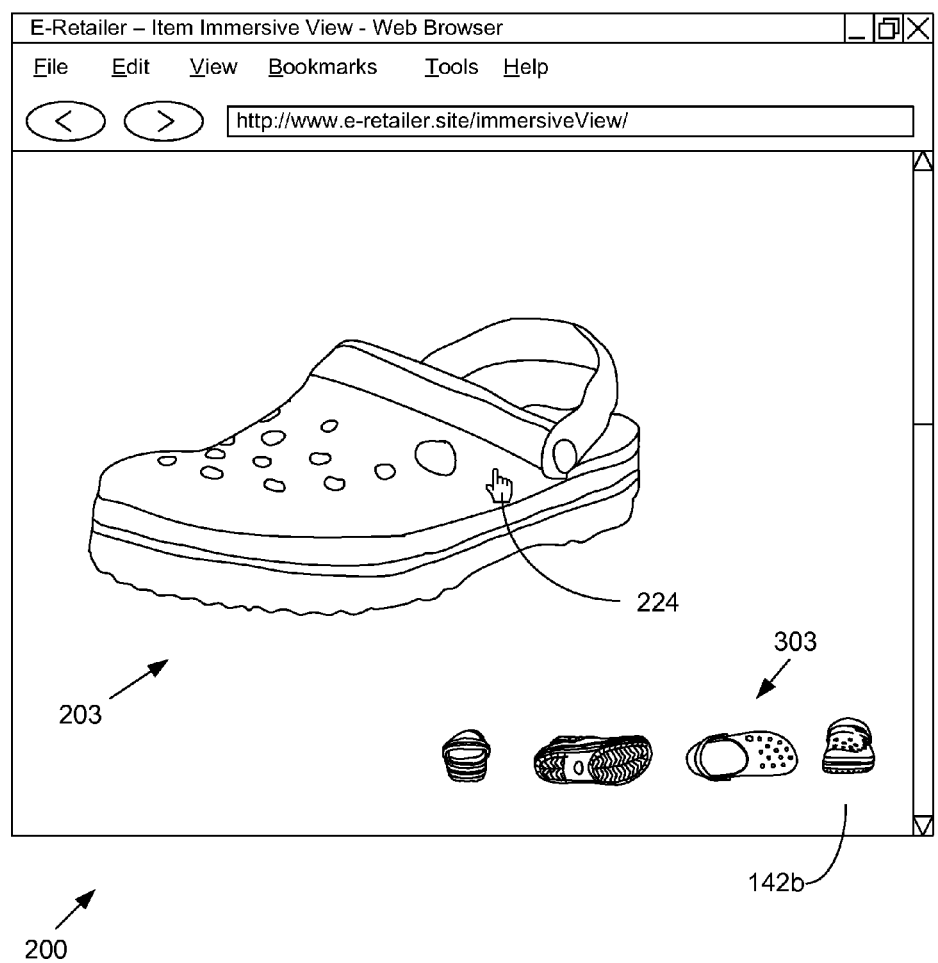

Continuing on to FIG. 3B, shown is the example of the user interface 200 as in FIG. 3A except that the user interface layer is completely hidden. In this example, the cursor 224 has been moved further toward or on top of the image, which has resulted in peripheral content and control components becoming invisible. However, in the non-limiting example of FIG. 3B, a view control 303 has appeared, which allows users to replace the primary item image 203 with alternate item images 203. In this example, the alternate item images 203 are represented as thumbnail images. Such alternate item images 203 may correspond to alternate views of the same item (e.g., different angles of the item, different colors of the item, etc.) or views of alternate items, such as similar items or other search results. When a user moves the cursor 224 over, or otherwise selects, an alternate item image 203, the primary item image 203 may then be replaced with the selected alternate item image 203.

It is understood that the view control 303 may be absent in some embodiments. In some embodiments, the view control 303 is a component of the user interface layer and may be hidden. In other embodiments, the view control 303 may persist when the user interface layer is hidden. In still other embodiments, the view control 303 may appear only when the user interface layer is hidden or partially hidden. In one embodiment, the view control 303 may include navigational controls to display thumbnails of additional alternate item images 203.

Figure 4:
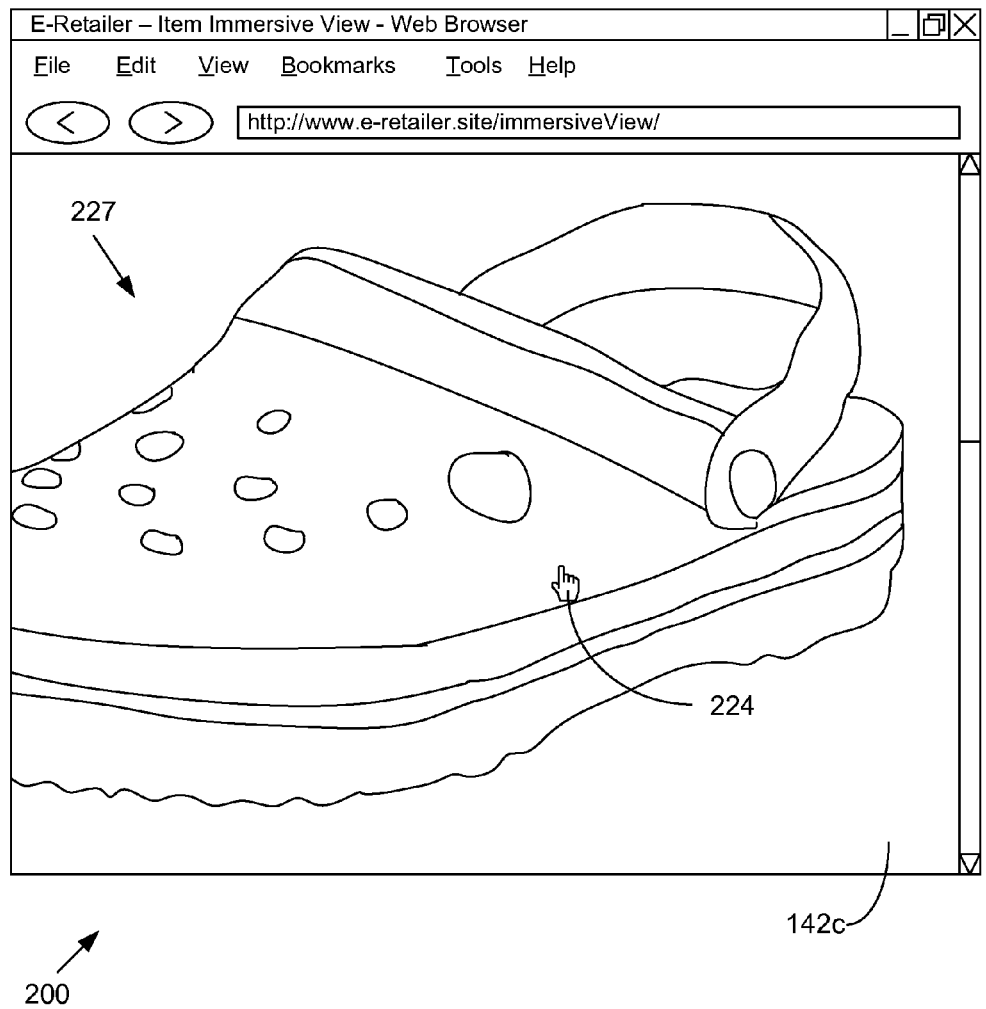

Moving on to FIG. 4, shown is another example of a user interface 200 rendered by a client application 139 (FIG. 1) executed in a client 106 (FIG. 1) in the networked environment 100 (FIG. 1). This example shows a rendered network page 142c embodying an immersive multimedia view 143 (FIG. 1) for an item which is a shoe. In particular, FIG. 4 shows the immersive multimedia view 143 with the item image 203 (FIG. 3A) having been replaced with a higher resolution item image 227 that fills the entire viewport of the rendered network page 142c.

In one embodiment, when the cursor 224 moves onto the item image 203, or a specific portion or region associated with the item image 203, the item image 203 is automatically replaced with the higher resolution item image 227. In another embodiment, when the user moves the cursor 224 onto an area associated with the item image 203 and single clicks, double clicks, or performs some other form of selection, the item image 203 is then replaced with the higher resolution item image 227. The user may be able to control scrolling/panning and/or zooming with the cursor 224 based on how the cursor 224 is moved. In various embodiments, a scroll wheel on a mouse attached to the client 106 may control panning and/or zooming. In other embodiments, single clicks, double clicks, or other forms of selection may control panning and/or zooming.

Figure 5:
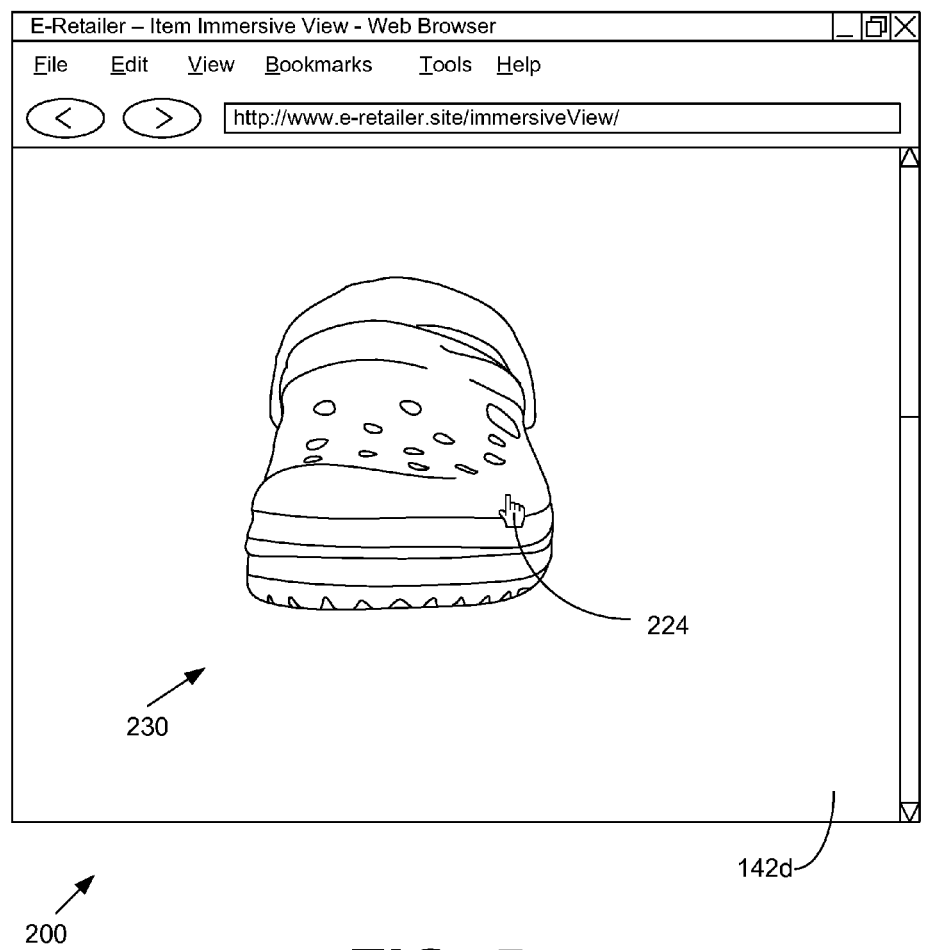

Continuing to FIG. 5, shown is another example of a user interface 200 rendered by a client application 139 (FIG. 1) executed in a client 106 (FIG. 1) in the networked environment 100 (FIG. 1). This example shows a rendered network page 142*d* embodying an immersive multimedia view 143 (FIG. 1) for an item which is a shoe. In particular, FIG. 5 shows the immersive multimedia view 143 with the item image 203 (FIG. 3A) having been replaced with an item video 230 that fills the entire viewport of the rendered network page 142*d*. It is noted that the user interface 200 in this example does not include any graphical playback controls for the item video 230. In other words, no user interface component has an appearance associated with video playback control.

In one embodiment, when the cursor 224 moves onto the item image 203, or a specific portion or region associated with the item image 203, the item image 203 is automatically replaced with the item video 230, which starts playing. As shown in FIG. 5, the view of the item is different in the item video 230 from the item image 203 because a different frame of the item video 230 is rendered. In one embodiment, playback of the item video 230 may commence upon a selection of the item image 203, e.g., by single clicking, double clicking, or some other form of selection. Playback of the item video 230 may be configured to stop when the cursor 224 moves off of the item video 230 or a portion of the item video 230, and/or in response to a single click, double click, or another form of selection.

Figure 6:
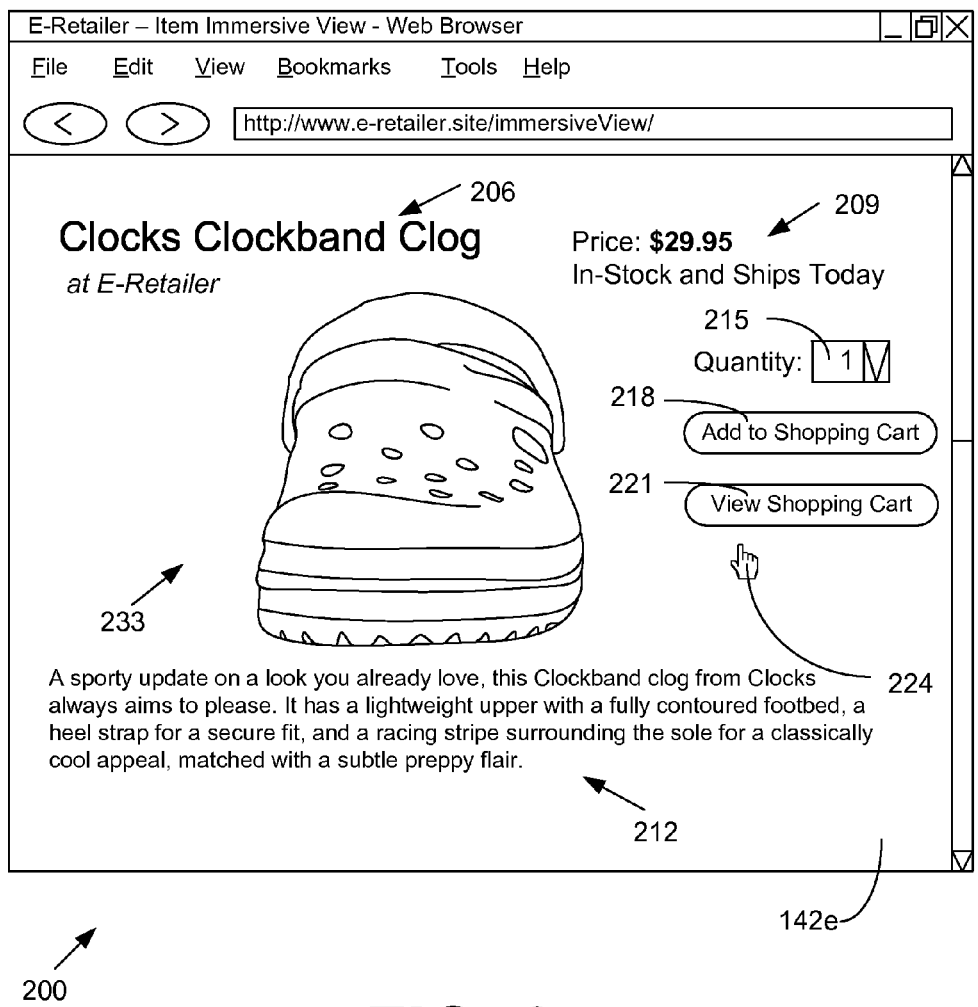

Turning now to FIG. 6, shown is another example of a user interface 200 rendered by a client application 139 (FIG. 1) executed in a client 106 (FIG. 1) in the networked environment 100 (FIG. 1). This example shows a rendered network page 142*e* embodying an immersive multimedia view 143 (FIG. 1) for an item which is a shoe. In particular, FIG. 6 shows the immersive multimedia view 143 as in FIG. 2 updated with a different item image 233 in place of the original item image 203 (FIG. 2). As in FIG. 2, the user interface layer is visible, including an item title 206, an item price 209, an item description 212, a quantity selector 215, an add to shopping cart component 218, a view shopping cart component 221, and/or other elements.

In the example of FIG. 6, the item video 230 (FIG. 5) may have stopped playback at a key frame corresponding to the different item image 233. Thus, in this example, the key frame continues to be rendered as the different item image 233. In other examples, the item image 203 may be replaced with the different item image 233 based on a selection of an icon or other user interface component, merely to show another view of the item or another option for the item. In addition, different item videos 230 may be selectable to be played in the immersive multimedia view 143.

Figure 7:
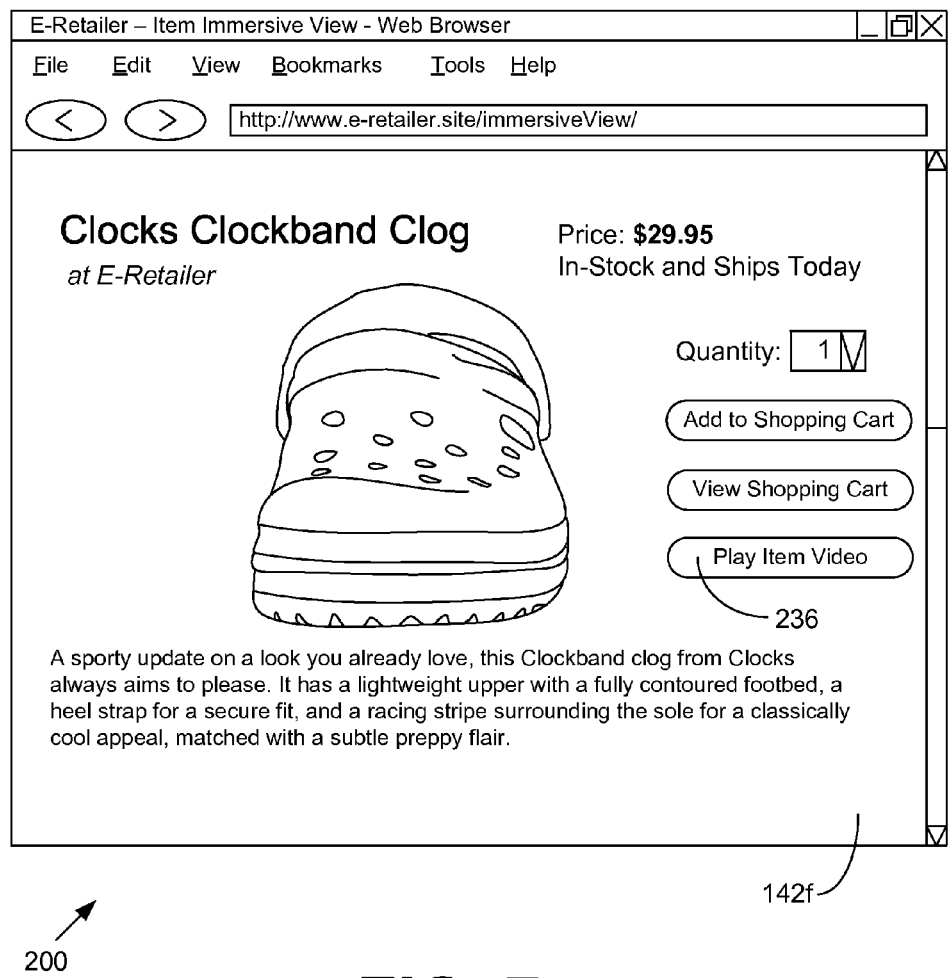

With reference to FIG. 7, shown is another example of a user interface 200 rendered by a client application 139 (FIG. 1) executed in a client 106 (FIG. 1) in the networked environment 100 (FIG. 1). This example shows a rendered network page 142*f* embodying an immersive multimedia view 143 (FIG. 1) for an item which is a shoe. In contrast to FIGS. 2-6, FIG. 7 includes a video playback control 236 for commencing playback of an item video 230 (FIG. 5). When a user hovers the cursor 224 over, clicks on, or otherwise selects the video playback control 236, the immersive view code 130 (FIG. 1) is configured to replace the item image 203 (FIG. 2) with the item video 230 and begin playback of the item video 230.

Figure 8:
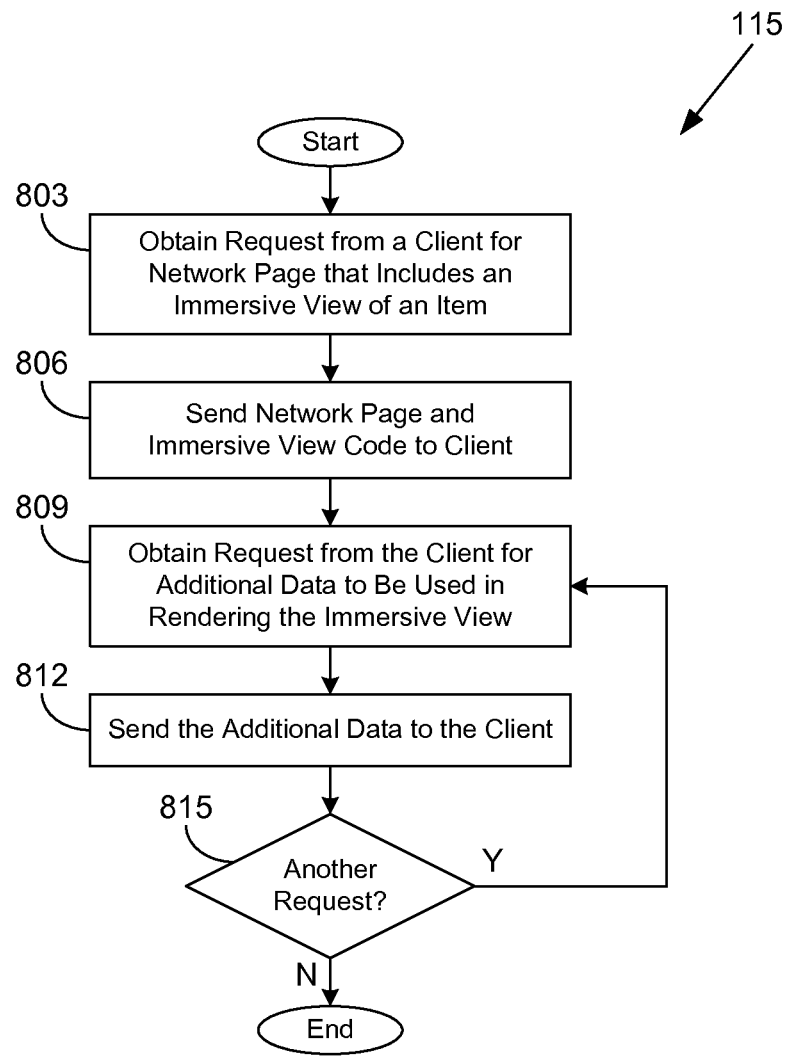
FIG. 8 is a flowchart illustrating one example of functionality implemented as portions of a network page server executed in a computing device in the networked environment of FIG. 1 according to various embodiments of the present disclosure.

Referring next to FIG. 8, shown is a flowchart that provides one example of the operation of a portion of the network page server 115 according to various embodiments. It is understood that the flowchart of FIG. 8 provides merely an example of the many different types of functional arrangements that may be employed to implement the operation of the portion of the network page server 115 as described herein. As an alternative, the flowchart of FIG. 8 may be viewed as depicting an example of steps of a method implemented in the computing device 103 (FIG. 1) according to one or more embodiments.

Beginning with box 803, the network page server 115 obtains a request from a client 106 (FIG. 1) for a network page that includes an immersive view of an item. In box 806, the network page server 115 sends the network page and immersive view code 130 (FIG. 1) to the client 106 as network data 118 (FIG. 1). In box 809, the network page server 115 obtains a request from the client 106 for additional data to be used in rendering the immersive view. As an example, the user at the client 106 may have selected another item to be shown in the immersive view. As another example, the user at the client 106 may have selected another media object to be shown in the immersive view. As yet another example, the immersive view code 130 may be pre-fetching network data 118 to be potentially used in updating the immersive view subsequently.

In box 812, the network page server 115 sends the additional data to the client 106. The client 106 may subsequently update the corresponding rendered network page 142 (FIG. 1) and the immersive multimedia view 143 (FIG. 1) shown on the display 136 (FIG. 1). In box 815, the network page server 115 determines whether another request for additional data has been obtained or will be obtained from the client 106. If so, the network page server 115 returns to box 809. If another request for additional data is not going to be obtained, the network page server 115 ends.

Figure 9A:
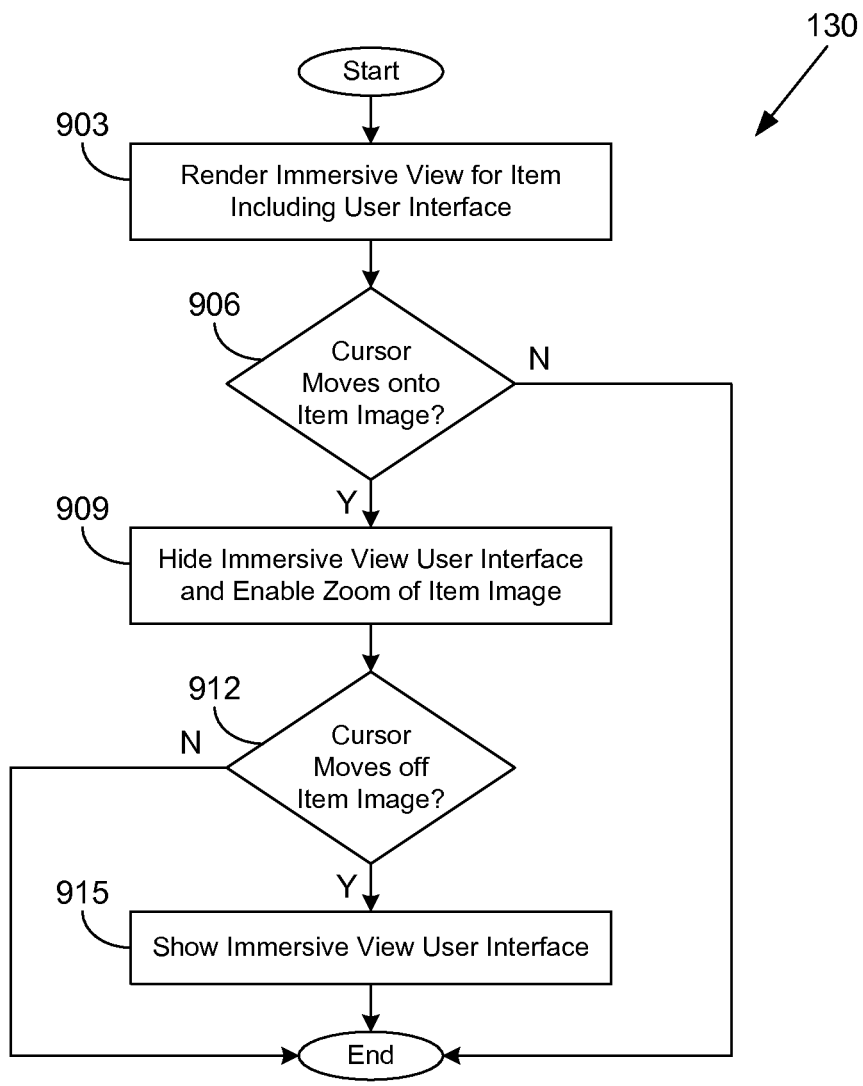
FIGS. 9A and 9B are flowcharts illustrating examples of functionality implemented as portions of immersive view code executed in a client application that is executed in a client in the networked environment of FIG. 1 according to various embodiments of the present disclosure.

Turning now to FIG. 9A, shown is a flowchart that provides one example of the operation of a portion of the immersive view code 130 as executed in a client application 139 (FIG. 1) according to various embodiments. It is understood that the flowchart of FIG. 9A provides merely an example of the many different types of functional arrangements that may be employed to implement the operation of the portion of the immersive view code 130 as described herein. As an alternative, the flowchart of FIG. 9A may be viewed as depicting an example of steps of a method implemented in the client 106 (FIG. 1) according to one or more embodiments.

Beginning with box 903, the immersive view code 130 renders an immersive multimedia view 143 (FIG. 1) for the item on the display 136 (FIG. 1). The immersive multimedia view 143 includes a user interface presented in a layer that surrounds an image of the item. In some embodiments, the user interface layer may have a transparent background, and some components of the user interface layer may overlap the image of the item.

In box 906, the immersive view code 130 determines whether a cursor moves onto a region associated with the image of the item. If the cursor does not move onto the region associated with the image of the item, the portion of the immersive view code 130 ends. Otherwise, if the cursor does move onto the region associated with the image of the item, the immersive view code 130 proceeds to box 909 and hides the user interface layer and enables zooming for the image of the item. For example, the immersive view code 130 may replace the image of the item with a higher resolution image of the item. The network data 118 (FIG. 1)

corresponding to the higher resolution image may be pre-fetched from the network page server 115 by the immersive view code 130 so as to avoid user-perceivable rendering delays. The user may be able to zoom in or zoom out by moving the cursor along one axis, single clicking, double clicking, or providing other types of input commands.

In box 912, the immersive view code 130 determines whether the cursor has moved off of the region associated with the image of the item. If the cursor has not moved off of the region associated with the image of the item, the portion of the immersive view code 130 ends. Otherwise, if the cursor has moved off of the region associated with the image of the item, the immersive view code 130 proceeds to box 915 and shows the user interface for the immersive multimedia view 143. For example, the immersive view code 130 may enable visibility for a user interface display layer in the immersive multimedia view 143 when the cursor moves toward a side of the region associated with the image of the item. Thereafter, the portion of the immersive view code 130 ends.

Figure 9B:
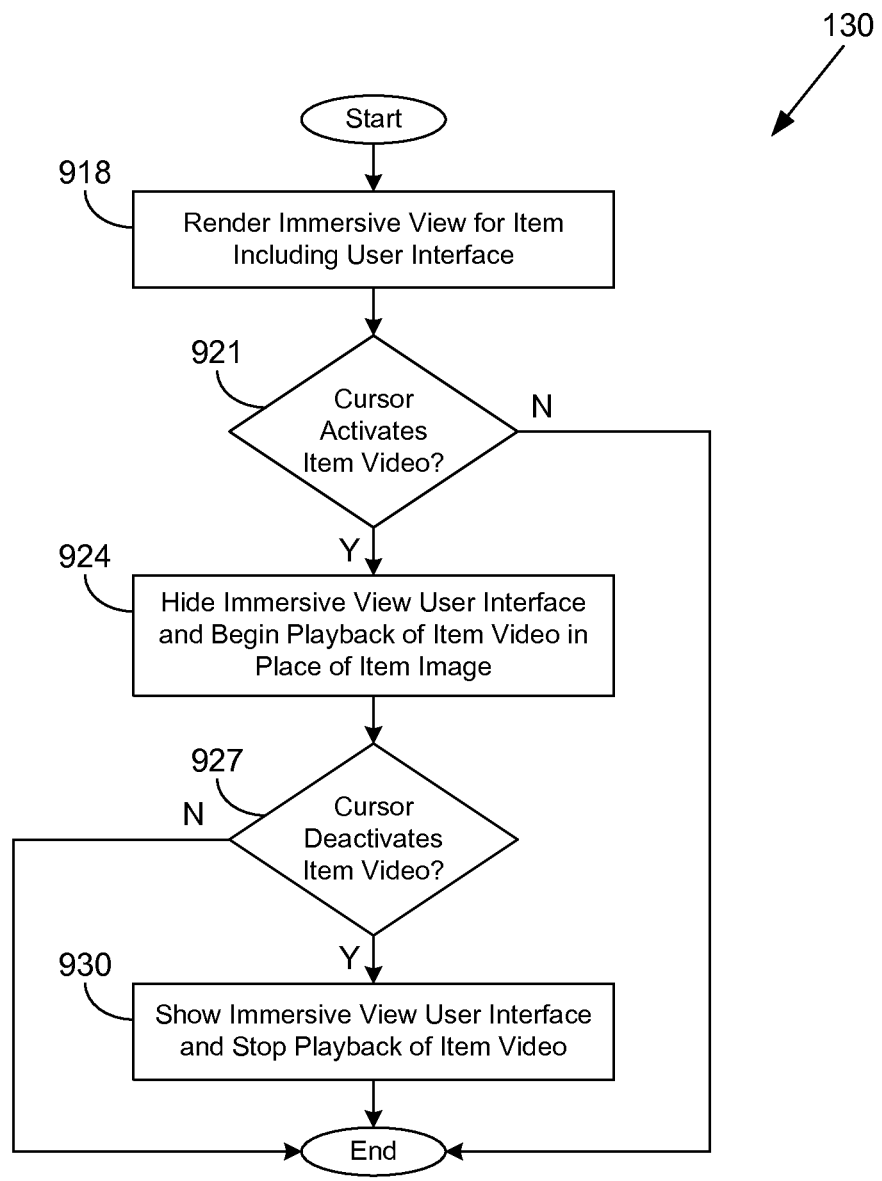

Continuing on to FIG. 9B, shown is a flowchart that provides one example of the operation of another portion of the immersive view code 130 as executed in a client application 139 (FIG. 1) according to various embodiments. It is understood that the flowchart of FIG. 9B provides merely an example of the many different types of functional arrangements that may be employed to implement the operation of the portion of the immersive view code 130 as described herein. As an alternative, the flowchart of FIG. 9B may be viewed as depicting an example of steps of a method implemented in the client 106 (FIG. 1) according to one or more embodiments.

Beginning with box 918, the immersive view code 130 renders an immersive multimedia view 143 (FIG. 1) for the item on the display 136 (FIG. 1). The immersive multimedia view 143 includes a user interface presented in a layer that surrounds an image of the item. In some embodiments, the user interface layer may have a transparent background, and some components of the user interface layer may overlap the image of the item. In box 921, the immersive view code 130 determines whether the cursor has activated playback of video of the item. In one embodiment, the user interface does not include any graphical controls for playback of the video, such as play buttons. In such an embodiment, merely moving the cursor over a region associated with the image of the item may commence playback of video. If the cursor has not activated playback of video of the item, the portion of the immersive view code 130 ends. Otherwise, the immersive view code 130 continues to box 924.

In box 924, immersive view code 130 hides the user interface for the immersive multimedia view 143 and begins playback of video of the item in place of the image of the item. In one embodiment, the image may be a key frame of the video, and the video may commence playback at that key frame. Thus, the immersive multimedia view 143 may seamlessly transition from the image to the video. To this end, the immersive view code 130 may be configured to pre-fetch the network data 118 (FIG. 1) corresponding to the video from the network page server 115 (FIG. 1).

In box 927, the immersive view code 130 determines whether the cursor has deactivated playback of the video of the item. For example, the user may move the cursor off of the region associated with the video or image of the item. If the immersive view code 130 determines that the cursor has not deactivated the playback of the video of the item, playback of the video may complete. In some cases, the video of the item may be replaced with the previously rendered image of the item or another image of the item. Alternatively, the last frame of the video of the item may remain rendered in the immersive multimedia view 143. Thereafter, the portion of the immersive view code 130 ends.

Otherwise, if the immersive view code 130 determines that the cursor has deactivated the playback of the video of the item, the immersive view code 130 proceeds to box 930. In box 930, the immersive view code 130 stops the playback of the video of the item and again shows the user interface. For example, the immersive view code 130 may enable visibility for a user interface display layer in the immersive multimedia view 143 when the cursor moves toward a side of the region associated with the image and video of the item. The video of the item may, for example, be replaced with the previously displayed image of the item or another image of the item. Alternatively, the video of the item may merely remain rendered in the immersive multimedia view 143 in a paused state. Thereafter, the portion of the immersive view code 130 ends.

Figure 10:
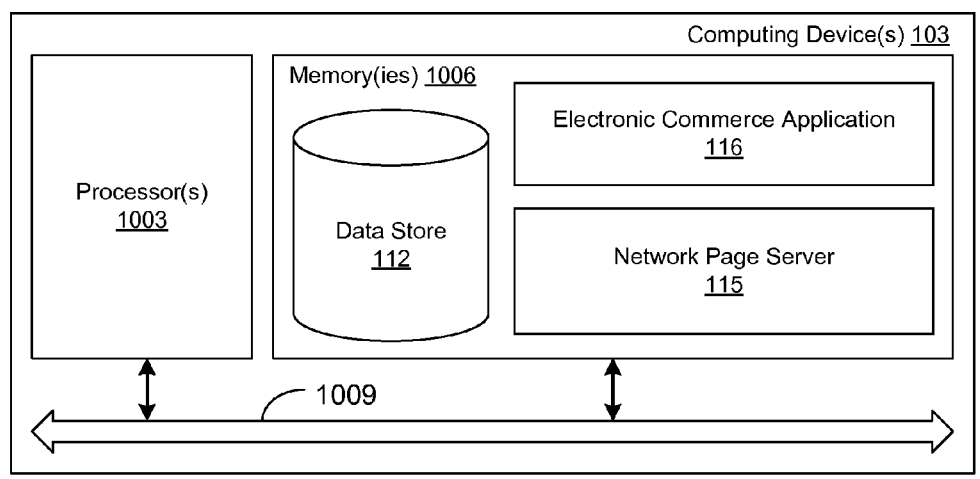
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the network page server 115, the electronic commerce application 116, and potentially other applications. Also stored in the memory 1006 may be a data store 112 and other data. In addition, an operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 109 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the network page server 115, the electronic commerce application 116, the immersive view code 130 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8, 9A, and 9B show the functionality and operation of an implementation of portions of the network page server 115 and the client application 139 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 8, 9A, and 9B show a specific order of execution, it is understood that the order of execution may differ from that which is depicted. For example, the order of execution of two or more blocks may be scrambled relative to the order shown. Also, two or more blocks shown in succession in FIGS. 8, 9A, and 9B may be executed concurrently or with partial concurrence. Further, in some embodiments, one or more of the blocks shown in FIGS. 8, 9A, and 9B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 115, the electronic commerce application 116, and the immersive view code 130, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:

render, upon a display, an immersive view for a product featuring an image of the product surrounded by peripheral content that provides information about the product and at least one control component that relates to placing an order for the product;

decrease an opacity, upon the display, of the peripheral content and the at least one control component when a cursor moves onto a first portion of the immersive view for the product; and replace, upon the display, the image of the product with a video stream of the product when the cursor moves onto a second portion of the immersive view for the product, the image of the product being an initial frame in the video stream of the product.

2. The non-transitory computer-readable medium of claim 1, wherein the first portion of the immersive view differs from the second portion of the immersive view.

3. The non-transitory computer-readable medium of claim 1, wherein the program, when executed, further causes the computing device to at least replace the image of the product in the immersive view with a higher resolution image of the product when the cursor selects the image of the product.

4. The non-transitory computer-readable medium of claim 3, wherein the program, when executed, further causes the computing device to at least facilitate scrolling for the higher resolution image of the product according to a movement of the cursor along at least one axis over the higher resolution image.

5. A system comprising:
a data store configured to store item data; and
a computing device in communication with the data store, the computing device configured to at least:
render, upon a display of the computing device, an immersive view for an item comprising an image of the item surrounded by peripheral content that provides information about the item and at least one control component that relates to placing an order for the item;
hide, upon the display of the computing device, the peripheral content and the at least one control component when a cursor moves onto a first portion of the immersive view of the item; and
replace, upon the display of the computing device, the image of the item with a video stream of the item when the cursor moves onto a second portion of the immersive view of the item.

6. The system of claim 5, wherein the image of the item corresponds to a key frame of the video stream of the item.

7. The system of claim 5, wherein the computing device is further configured to at least replace the image of the item in the immersive view with a higher resolution image of the item when the cursor selects a portion of the image of the item.

8. The system of claim 5, wherein the computing device is further configured to at least automatically commence playback of the video stream of the item when the image of the item is replaced with the video stream of the item.

9. The system of claim 5, wherein the computing device is further configured to at least:
stop the video stream of the item at a key frame after the video stream of the item commences playback; and
replace the video stream of the item that has been stopped with another image of the item that corresponds to the key frame.

10. The system of claim 5, wherein the computing device is further configured to at least decrease an opacity of the peripheral content and the at least one control component when the cursor moves toward the image of the item.

11. The system of claim 5, wherein the peripheral content and the at least one control component have a transparent background, and at least a portion of the peripheral content or the at least one control component overlaps the image of the item.

12. The system of claim 5, wherein the computing device is further configured to at least adjust at least one color of the item as shown in the video stream to correspond to at least one color associated with a variation of the item.

13. A computer-implemented method comprising:
under control of one or more computing devices configured with specific computer-executable instructions:
causing rendering, upon a display of a computing device, of an immersive view for an item comprising an image of the item surrounded by a user interface layer that provides information about the item;
causing the user interface layer to be hidden upon the display of the computing device when a cursor moves onto a first portion of the immersive view of the item; and
causing the image of the item to be replaced upon the display of the computing device with a video stream of the item when the cursor moves onto a second portion of the immersive view of the item.

14. The computer-implemented method of claim 13, wherein content of the user interface layer overlaps the image of the item when the user interface layer is not hidden.

15. The computer-implemented method of claim 13, further comprising causing the video stream of item to be stopped upon the display of the computing device in response to the cursor moving off the second portion of the immersive view.

16. The computer-implemented method of claim 13, further comprising causing the image of the item in the immersive view to be replaced upon the display of the computing device with a higher resolution image of the item when the cursor selects a portion of the image of the item.

17. The computer-implemented method of claim 13, further comprising causing at least one color of the item as shown in the video stream upon the display of the computing device to be adjusted to correspond to at least one color associated with a variation of the item.

18. The computer-implemented method of claim 13, wherein the image of the item corresponds to a key frame of the video stream of the item, the computer-implemented method further comprising causing the video stream of the item to be played upon the display of the computing device starting at the key frame.

19. The computer-implemented method of claim 18, further comprising:
causing the video stream of the item to be stopped at another key frame upon the display of the computing device after the video stream has commenced playback; and
causing the video stream of the item that is stopped to be replaced upon the display of the computing device with another image of the item that corresponds to the another key frame.

20. The computer-implemented method of claim 13, further comprising causing the image of the item to be replaced upon the display of the computing device with another image of the item in the immersive view in response to a user selection of an option component in the user interface layer.

* * * * *